United States Patent
Ebinger et al.

[11] Patent Number: 5,802,916
[45] Date of Patent: Sep. 8, 1998

[54] SHIFT DEVICE FOR A CHANGE SPEED-GEARBOX

[75] Inventors: Thilo Ebinger, Stuttgart; Hans-Jürgen Neubauer, Remshalden; Martin Schetter, Besigheim, all of Germany

[73] Assignee: Mercedes-Benz AG, Stuttgart, Germany

[21] Appl. No.: 815,264

[22] Filed: Mar. 10, 1997

[30] Foreign Application Priority Data

Mar. 9, 1996 [DE] Germany ............... 196 09 209.4

[51] Int. Cl.$^6$ .................................................. B60K 20/00
[52] U.S. Cl. ................... 74/360; 74/473.28; 74/473.37
[58] Field of Search .................. 74/355, 356, 359, 74/360, 373, 374, 473.21, 473.24, 473.25, 473.36, 473.37, 473.28

[56] References Cited

U.S. PATENT DOCUMENTS

| 3,242,759 | 3/1966 | Magg et al. ............ 74/473.25 |
| 4,290,318 | 9/1981 | Ookubo et al. ........... 74/473.19 |
| 4,291,793 | 9/1981 | Klasing ................. 74/505 X |
| 4,337,675 | 7/1982 | Holdeman ............... 74/473.24 |
| 4,793,202 | 12/1988 | Okubo .................. 74/473.37 |
| 5,186,070 | 2/1993 | Nitzschke et al. ........ 74/473.24 |
| 5,309,785 | 5/1994 | Knape .................. 74/473.24 |

FOREIGN PATENT DOCUMENTS

| 2456962A1 | 6/1975 | Germany . |
| 3446357A1 | 6/1985 | Germany . |
| 4118931A1 | 12/1992 | Germany . |

OTHER PUBLICATIONS

Patent Abstracts of Japan, Pub. No. 06337065A, Dec. 12, 1994, "Transmission Operation Device for Tractor".

Primary Examiner—Rodney H. Bonck
Assistant Examiner—Scott Lund
Attorney, Agent, or Firm—Evenson McKeown Edwards & Lenahan PLLC

[57] ABSTRACT

In a shift device of a change speed gearbox, a shift rod is mounted axially displaceably on a shift casing unit and on a casing part, securing the latter, of a gearbox casing, which is divided into two, and a shift rocker is pivotably mounted on two bearing brackets of the shift casing unit.

33 Claims, 8 Drawing Sheets

SHIFT DEVICE FOR A CHANGE SPEED-GEARBOX

BACKGROUND AND SUMMARY OF THE INVENTION

This application claims the priority of German application 196 09 209.4 filed in Germany on Mar. 9, 1996, the disclosure of which is expressly incorporated by reference herein.

The present invention is also related to commonly assigned application Ser. No. 08/815,263, filed herewith and based on German application 196 09 210.8, filed Mar. 9, 1996 in Germany, the contents of which are incorporated herein by reference thereto.

The invention relates to a shift device of a change speed gearbox with a two part gearbox casing and shift rod and rocker assemblies supported at the casing.

In a shift device of the general type related to the invention and described in German Patent Document DE 41 18 931 A1, the shift casing unit is used for accommodating not only the two front bearings for the axially displaceable arrangement of two shift rods but also the latching devices for the positions of the shift rods, a locking device for locking the respectively non-activated shift rod and an intermediate locking bolt, the latter interacting with a pivotable intermediate locking lever which is operatively connected to two shift rockers in such a way that the activation of a shift rod or of a shift rocker into a gear speed position corresponding to an engaged state of the associated gear wheel clutch causes the other shift rods and shift rockers to be forcibly captively secured in relation to the casing housing.

In this shift device, two shift rockers are used, one of which is directly pivotably mounted in the output-side casing part of the gearbox casing and the other of which is directly pivotably mounted in the input-side casing part of the gearbox casing which is divided in two.

In shift devices of this type with one or more shift rockers, there is often the problem of at least one shift rocker having to be fitted "in the open air", i.e. without its bearing assigned to the gearbox casing, onto the sliding shift sleeve which is premounted in the one casing part together with the gearbox shafts and the gear wheels, the intention still then being, as far as possible, that the at least one shift rocker should be positioned, after the mounting of the other casing part, in such a way that the bearing bolts of the pivot bearings can also still be mounted.

German Patent Document DE 34 46 357 A1 discloses an arrangement, not of the generic type referred to above, for fastening a gear wheel shift device in a gearbox having a multiplicity of shift rods which bear a corresponding multiplicity of shift forks which are axially movable in relation to a gearbox casing in order to activate a multiplicity of clutches in order to cause alternative gear wheels to mesh and to give the gearbox different transmission ratios. In this known arrangement, in contrast to a shift device of the generic type, shift forks which are axially displaceably arranged in the gearbox casing are exclusively used, the latter also being divided into three. In the respective publication, it is considered a disadvantage that the gearbox casing which is manufactured by casting requires, for the bearing eyes and their subsequent machining, material accumulations which are included in the casting at these points but which led to stress concentrations which reduced the strength. In order to avoid or reduce this disadvantage, in this known arrangement there is provision for a bearing bracket which is in particular designed in one piece to be releasably attached to the gearbox casing and enclosed by the gearbox casing and constructed with bearings for the shift rods, the latter being borne at least partially by the bearing bracket.

German Patent Document DE 24 56 962 A1 discloses a shift device for change speed gearboxes, in particular for motor vehicles of the countershaft type, which shift device is not of the generic type, is constructed either for the use of shift forks exclusively or for the use of shift rockers exclusively, and in which a shift shaft and positively engaging gear speed clutches, especially shift sleeves are mounted axially displaceably and rotatably in the gearbox casing. The gearbox casing is divided, in further contrast to the definition of the class, into two parallel dividing planes, which lie parallel to the gearbox shafts, and into three casing parts, specifically into one casing part which supports the gearbox shafts and the shift rockers, into a casing cover which supports the shift rods, and finally into a shift dome, which can be fitted onto the casing cover, for supporting a shift shaft which activates the shift rods with a shift finger. In this publication, in the case of a shift device which is equipped exclusively with shift forks, it is considered disadvantageous that large operating forces are necessary for carrying out a gear change owing to large friction losses in the transmission mechanism. According to this publication, the shift devices operating with only shift rockers have the disadvantage that necessary installation, or retrofitting, depending on the use of the change speed gearbox employing parts of known shift devices is not possible with this embodiment. In order to avoid the aforesaid disadvantages without increasing the shifting forces, in this known shift device the design is such that a shift shaft which is mounted in the shift dome forms one kinematic unit with a shift lever which is arranged fixedly in terms of rotation and a driver with shift rods guided in the gearbox casing cover, transverse holes in the shift rods serving to accommodate guide elements in order to make the drive connection to the shift rockers which [lacuna] with fork-shaped grooves in which the guide elements engage—but when known shift forks are used the transverse holes are dispensed with and the shift forks are attached onto the shift rods in a manner known per se. In a further shift device, of a different generic type, for a change speed gearbox for a tractor (Patent Abstracts of Japan; JP 0 633 7065 A1) two sliding shift sleeves which are displaceably arranged on an output shaft are activated by one shift fork in each case. The shift forks are mounted axially displaceably in a shift casing, fitted onto the gearbox casing, and can be activated by shift cams of a shift shaft, also used for mounting the shift forks, of the shift casing.

An object on which the invention is based is to provide an arrangement facilitating the mounting in the case of a shift device of the type mentioned at the beginning.

This object is advantageously achieved in accordance with preferred embodiments of the invention by providing an arrangement characterized in that the shift casing unit has two bearing brackets which are in the form of carriers and are arranged on respective sides of the shift rocker and extend in the longitudinal direction of the gearbox shafts, in that the shift casing unit has, at a point located offset with respect to the bearing arrangement for the shift rocker in the longitudinal direction of the gearbox shafts, a crossmember which is in the form of a carrier, is arranged transversely with respect to the gearbox shafts and is used to arrange the two bearing brackets fixedly in terms of movement relative to one another, in that the two pivot bearings are arranged one in each case on one of the bearing brackets, and in that the end of the shift casing unit located opposite the bearing arrangement for the shift rod can be fixed in relation to the second casing part at least in the directions which are perpendicular to the gearbox shafts by means of at least one releasable support.

In the case of the shift device according to the invention, the shift casing unit forms, with the two bearing brackets and the crossmember, an enclosed frame which bears the shift rod and the shift rocker. The shift shaft which is used for activating the shift rod and shift rocker in a known manner, with its shift fingers, can be supported during mounting in a mounting frame or also in the shift casing unit with advantages for mounting.

In the shift device according to the invention, the shift casing unit which is completed by the shift rod and shift rocker is fitted onto the sliding shift sleeves of the gearbox shafts and introduced together with the latter into the casing part which supports the shift rod. Then, the shift casing unit is secured in relation to this casing part at two points. After the other casing part has been mounted, the support of the shift casing unit in relation to this casing part advantageously contributes to the alignment of the shift casing unit in relation to the gearbox casing and in relation to the gearbox shafts, respectively.

In the case of shift devices constructed according to the invention, the problem explained at the beginning with the mounting of the shift rockers has been obviated because the shift rockers are located in the bearing brackets which, in the case of mounting, are initially placed in front of that casing part of the gearbox casing which supports the shift rod, the shift rockers thus also being automatically located at the correct point in the gearbox casing after the other casing part has been mounted.

An advantageous refinement of the support of the shift casing unit on the other parts is provided according to preferred embodiments of the invention by providing an arrangement wherein in each case one guide pin, arranged with an axis parallel to the gearbox shafts, of the bearing brackets is used for the support.

An advantageous refinement of that part of the shift casing unit in the case of the shift device according to the invention which is directly secured to that casing part of the gearbox casing which supports the shift rod, wherein the shift casing unit has an end plate, which bears the bearing arrangement for the shift rod, and is arranged in a casing plane, perpendicular with respect to the gearbox shafts, as well as being arranged essentially fixedly in terms of movement with respect to the bearing brackets.

An advantageous refinement of the attachment between the bearing bracket, the end plate and that casing part of the gearbox casing, in the case of the shift device according to the invention, which supports the shift rod, is provided wherein at least one of two attachments between the shift casing unit and that first casing part of the gearbox casing which bears the shift rod is provided, and wherein the first casing part is connected by the one attachment to that part of the end plate which is connected to a bearing bracket, and by means of the other attachment to that part of a bearing bracket which is connected to the end plate.

Particularly structurally advantageous extension of the "shift casing unit" mounting element by means of the latching devices, assigned to the shift elements, in the case of the shift device are provided according to preferred embodiments of the invention.

In particular preferred embodiments of the invention, the shift casing unit is constructed as an inherently rigid frame, which can be manufactured using sheet-steel stamping technology, fine-cutting technology and sheet-steel shaping technology.

In certain preferred embodiments of the invention, at least one further shift rod and/or at least one further shift rocker with the associated latching devices is provided.

In certain preferred embodiments of the invention, the "inner shift system" in the case of the shift device is constructed as a premountable physical unit which is, for example, supplied in its complete form as a supplier part to the gearbox department and mounted there.

In the case of the shift device according to the invention, a premounted unit, constituting at maximum the complete internal shift system, is provided which comprises all the shift rods, shift rockers, associated bearings and latching devices as well as the locking assembly according to the above mentioned related commonly assigned patent application.

According to certain alternative embodiments of the invention, there may, as appropriate, be bearings at the ends of the shift casing unit which are located in the longitudinal direction of the gearbox shafts and can be realized easily and cost-effectively with holes in the main processing direction of the gearbox casing as well as, under certain circumstances, latching devices which can be integrated into other elements which it is mandatory to seat on the outside of the gearbox casing, for example into a reverse light switch.

In the case of the shift device according to certain preferred embodiments of the invention, the premounted unit can be mounted outside the gearbox casing and, as appropriate, fitted, as the complete system, on the gearbox shafts using a "support", i.e. a device which is part of the installation or supplier circulation, and can be inserted with the gearbox shafts into that casing part of the gearbox casing which supports the shift rods. After the shift casing unit has been secured to the casing part supporting the shift rods, the "carrier" is removed and returned to the installation circulation.

In the shift devices according to certain preferred embodiments of the invention, all the processing in the transverse direction of the gearbox, which would usually be necessary for latching devices and the like as well as for the pivot bearings of the shift rockers, is dispensed with.

In the shift device according to the invention, all the latching devices can be arranged on the bearing brackets and/or on the end plate.

In the shift device according to the invention, the latching devices which are assigned to the shift rockers can also act on the pivotably movable locking elements, coupled to the shift rockers, in accordance with the above mentioned commonly assigned patent application.

In the shift device according to the invention, the shift casing unit can also be used to support the shift shaft in order to activate the shift rods and shift rockers.

The principle of an enclosed, frame-shaped shift casing unit according to the invention, can also be applied to a shift device which operates exclusively with shift rockers.

The principle of a central end plate, and thus the formation of a module, according to the invention, can also be applied in a shift device which operates exclusively with shift rods.

Other objects, advantages and novel features of the present invention will become apparent from the following detailed description of the invention when considered in conjunction with the accompanying drawings.

DETAILED DESCRIPTION OF THE DRAWINGS

Figure 1:
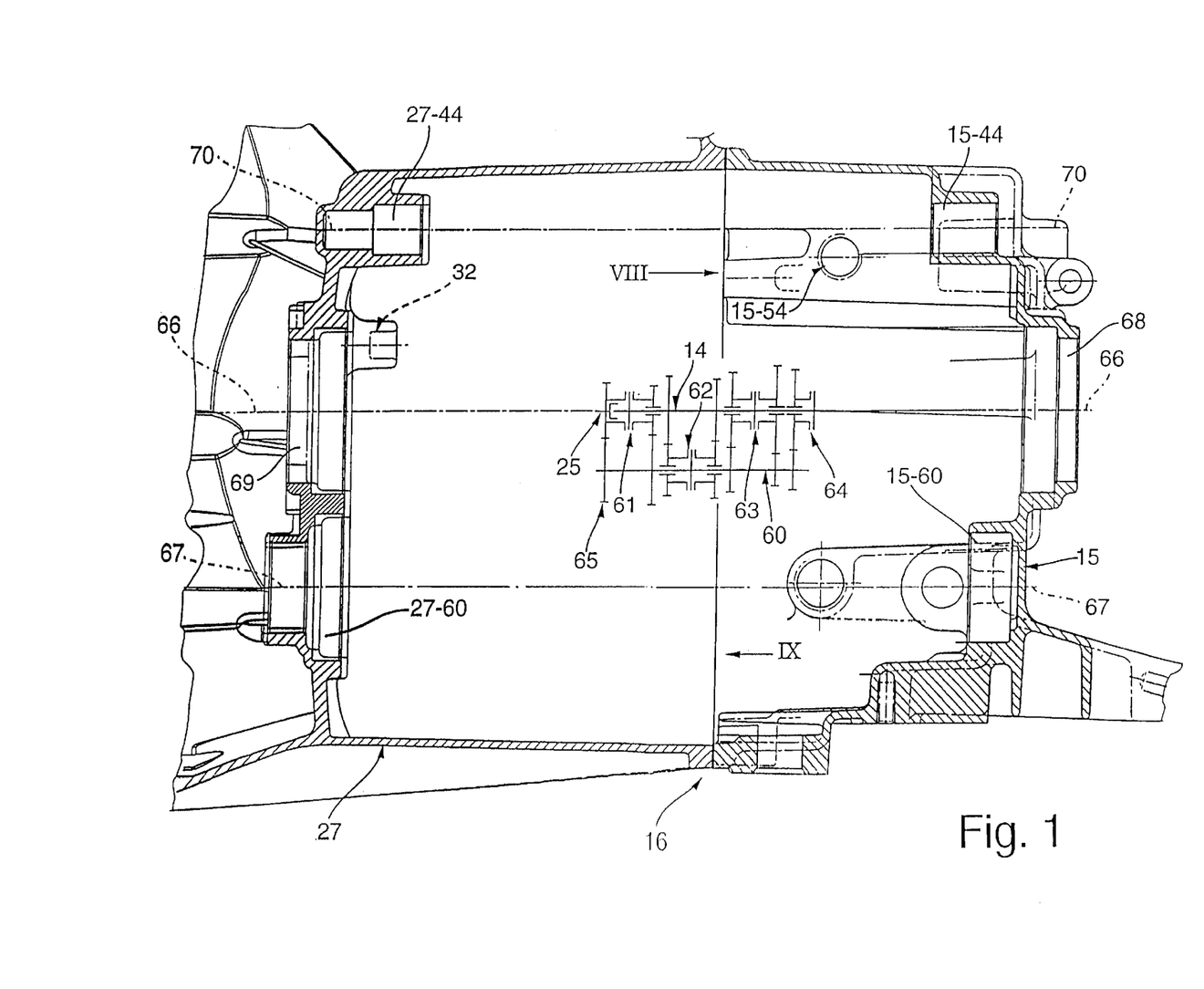
FIG. 1 shows a basic gearbox diagram showing superimposed a longitudinal sectional view of a change speed gearbox constructed according to a preferred embodiment of the present invention.

According to FIG. 1, a change speed gearbox has an output shaft 14 which is coaxial to an input shaft 25, as well as a parallel countershaft 60, the latter having a continuous drive connection to the input shaft 25 in a known manner by means of a gearbox constant.

A gear wheel clutch 61 which is arranged on the output shaft 14 is used for optionally coupling either the input shaft 25 or a gear wheel to the output shaft 14 by means of a sliding shift sleeve 56.

A gear wheel clutch 62 which is arranged on the countershaft 60 is used for optionally coupling two adjacent gear wheels to the countershaft 60 by means of a sliding shift sleeve 20.

A gear wheel clutch 63 which is arranged on the output shaft 14 is used for optionally coupling two adjacent gear wheels to the output shaft 14 by means of a sliding shift sleeve 10.

A gear wheel clutch 64 which is arranged on the output shaft 14 is used for coupling a further gear wheel to the output shaft 14 by means of a sliding shift sleeve 52.

The sliding shift sleeve 10 is activated in the usual manner by means of a shift fork 11 which is constructed in one piece with a shift rod 12.

The sliding shift sleeve 52 is activated in the usual manner by means of a shift fork 53 which is constructed in one piece with a shift rod 49.

Figure 7:
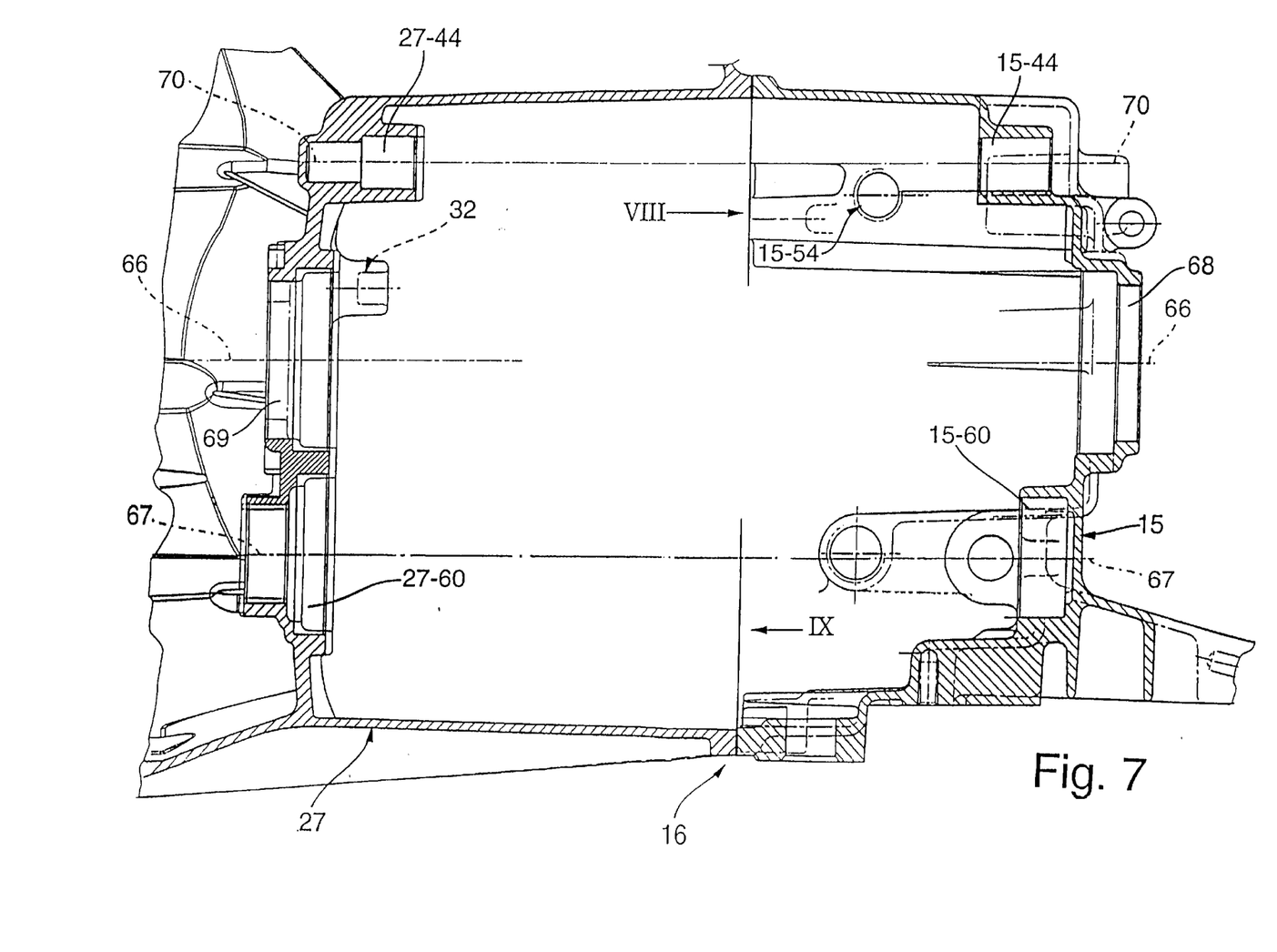
FIG. 7 shows a longitudinal section through the gearbox casing, shown in an individual view of the change speed gearbox in FIG. 1.
Figure 8:
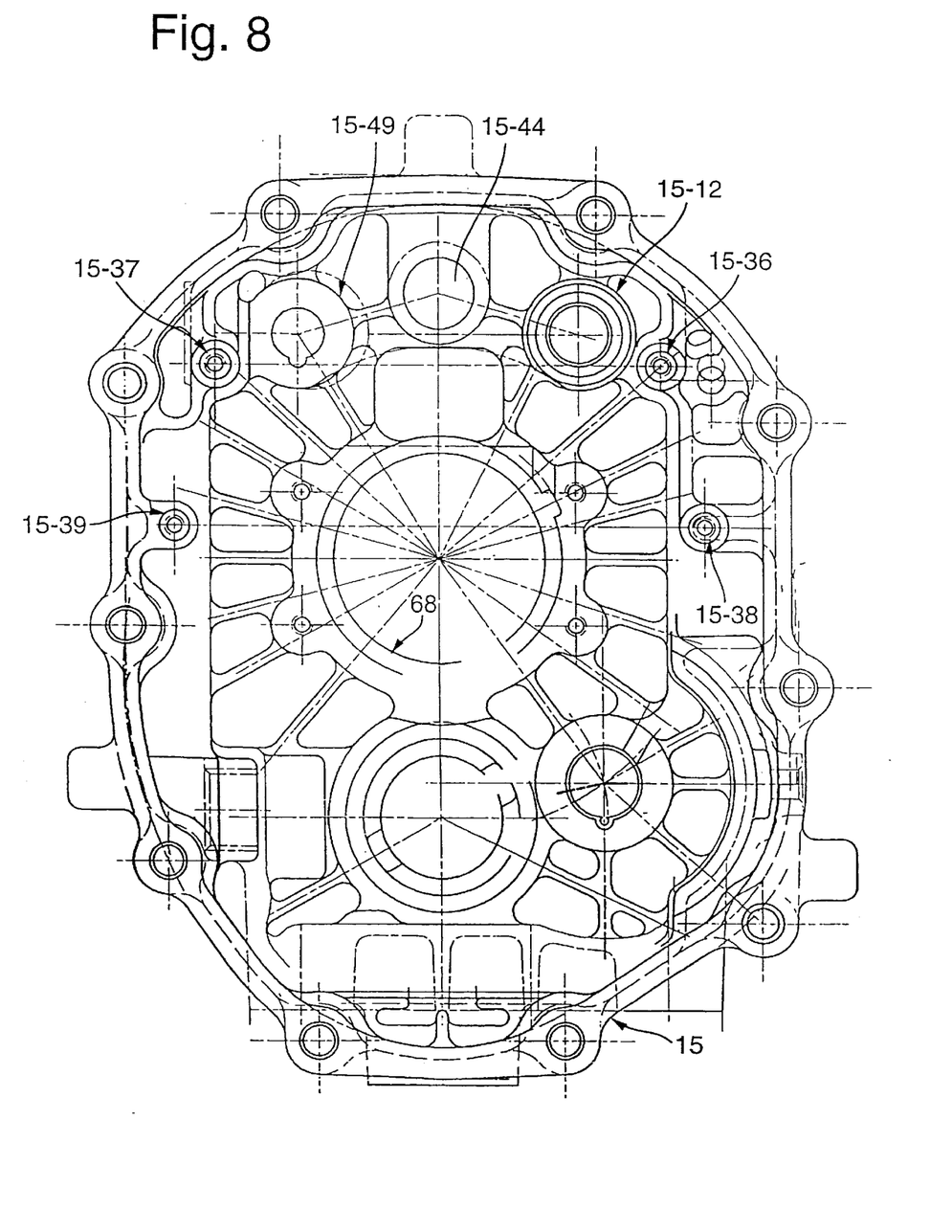
FIG. 8 shows that casing part of the gearbox casing in FIG. 7 which supports the shift rods of the shift device in FIG. 2, in a view in the direction of the arrow VIII in FIG. 7.
Figure 9:
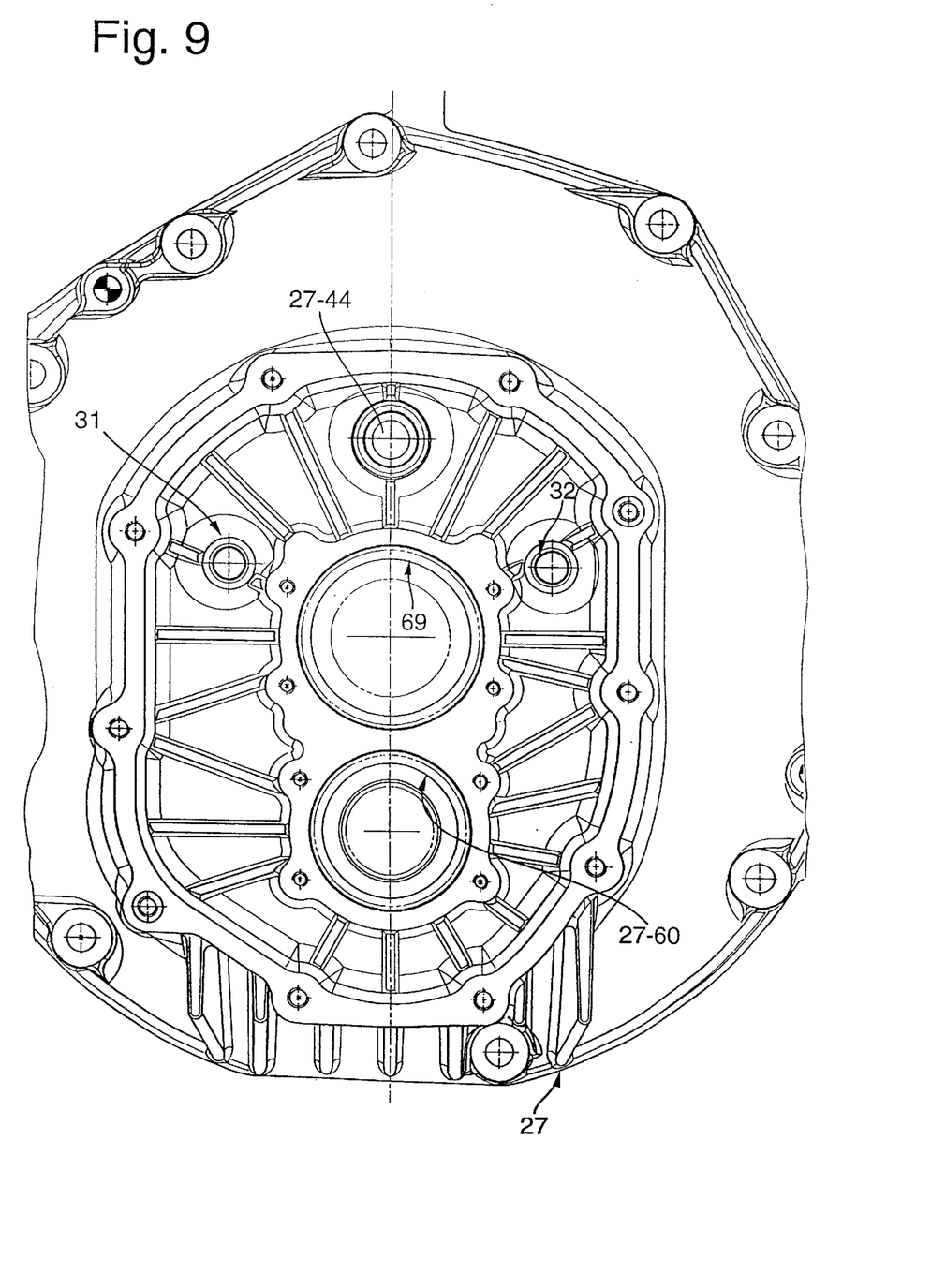
FIG. 9 shows that casing part of the gearbox casing in FIG. 7 which accommodates the shift rockers of the shift device in FIG. 2, in a view in the direction of the arrow IX in FIG. 7.

The gearbox casing 16 is subdivided into an output-side casing part 15 and into an input-side casing part 27 in a casing plane which is perpendicular to a bearing axis 66—66 which coincides with the axes of rotation of the output shaft 14 and input shaft 25 in the installed state. The output-side casing part 15 has a casing opening 68, coaxial to the bearing axis 66—66, for the output shaft 14 to be supported on and to pass through. The input-side casing part 27 has a casing opening 69, coaxial to the bearing axis 66—66, for the input shaft 25 to be supported on and to pass through.

The gearbox casing 16 has a lower bearing axis 67—67 with which the axis of rotation of the countershaft 60 coincides in the installed state. The output-side casing part 15 has a bearing eye 15-60, coaxial to the bearing axis 67—67, for supporting the adjacent end of the countershaft 60. The input-side casing part 27 has a bearing eye 27-60, coaxial to the bearing axis 67—67, for supporting the adjacent end of the countershaft 60.

The gearbox casing 16 has a bearing axis 70—70 which is parallel to the bearing axis 66—66 and is located above the gearbox shafts 14, 25 and 60 and with which the axis of rotation of a shift shaft 44 coincides in the installed state, which shift shaft 44 is supported by a bearing arrangement 71 in a bearing eye 15-44, coaxial to the bearing axis 70—70, of the output-side casing part 15 and by a bearing arrangement 72 in a bearing eye 27-44, coaxial to the bearing axis 70—70, of the input-side casing part 27, in each case serves to be rotationally and axially displaceable in relation to the gearbox casing 16.

Arranged at the opposite end of the casing part 15 to the casing opening 68 is an end plate 35 in a casing plane which is perpendicular to the bearing axis 66—66. The end plate 35 which is arranged above the gearbox shafts 14, 25, 60 is bolted tight to the casing part 15; for this purpose, the end plate 35 has two lateral attachment openings 36 and 37, and the casing part 15 has corresponding threaded holes 15-36 and 15-37.

The gearbox casing 16 has a bearing axis 73—73 which is located above and parallel to the bearing axis 66—66. In the installed state, the shift rod 12 is supported so as to be displaceable along this bearing axis 73—73 in relation to the gearbox casing 16. For this purpose, the one end of the shift rod 12 is supported by means of a bearing arrangement 18 in a bearing eye 15-12, coaxial to the bearing axis 73—73, of the output-side casing part 15, and by means of a bearing arrangement 19 in a bearing eye 35-12, coaxial to the bearing axis 73—73, of the end plate 35. The shift rod 12 penetrates the bearing arrangement 19 and end plate 35 and has at its end opposite the bearing arrangement 18 a shift slot 74 for the engagement of a shift finger 75 of the shift shaft 44. The positions of the shift rod 12 for the engaged and the disengaged state of the associated gear wheel clutch 63 can be fixed in relation to the gearbox casing 16 by means of a latch device 48 in which a sprung latching means 85, arranged in a corresponding receptacle 35-48 of the end plate 35, interacts with a corresponding latching means contour of the shift rod 12.

The gearbox casing 16 has a bearing axis 76—76 which is located above and parallel to the bearing axis 66—66. In the installed state, the shift rod 49 is supported so as to be axially displaceable along this bearing axis 76—76 in relation to the gearbox casing 16. For this purpose, the shift rod 49 is supported at its one end by means of a bearing arrangement 77 in a bearing eye 15-49, coaxial to the bearing axis 76—76, of the output-side casing part 15 and by means of a bearing arrangement 78 in a bearing eye 35-49, coaxial to the bearing axis 76—76, of the end plate 35. The shift rod 49 penetrates bearing arrangement 78 and end plate 35 and has at its end opposite the bearing arrangement 77 a shift slot 79 for the engagement of a shift finger 80 of the shift shaft 44. The positions of the shift rod 49 for the engaged and the disengaged state of the associated gear wheel clutch 64 can be fixed in relation to the gearbox casing 16 by means of a latching device 51. A reverse light switch 54 which is inserted into an associated casing opening 15-54 of the output-side casing part 15 is used for this device, the switch contact 86 of which reverse light switch 54 interacts, as a sprung latching means, with a corresponding latching means contour 87 of the shift rod 49.

Figure 2:
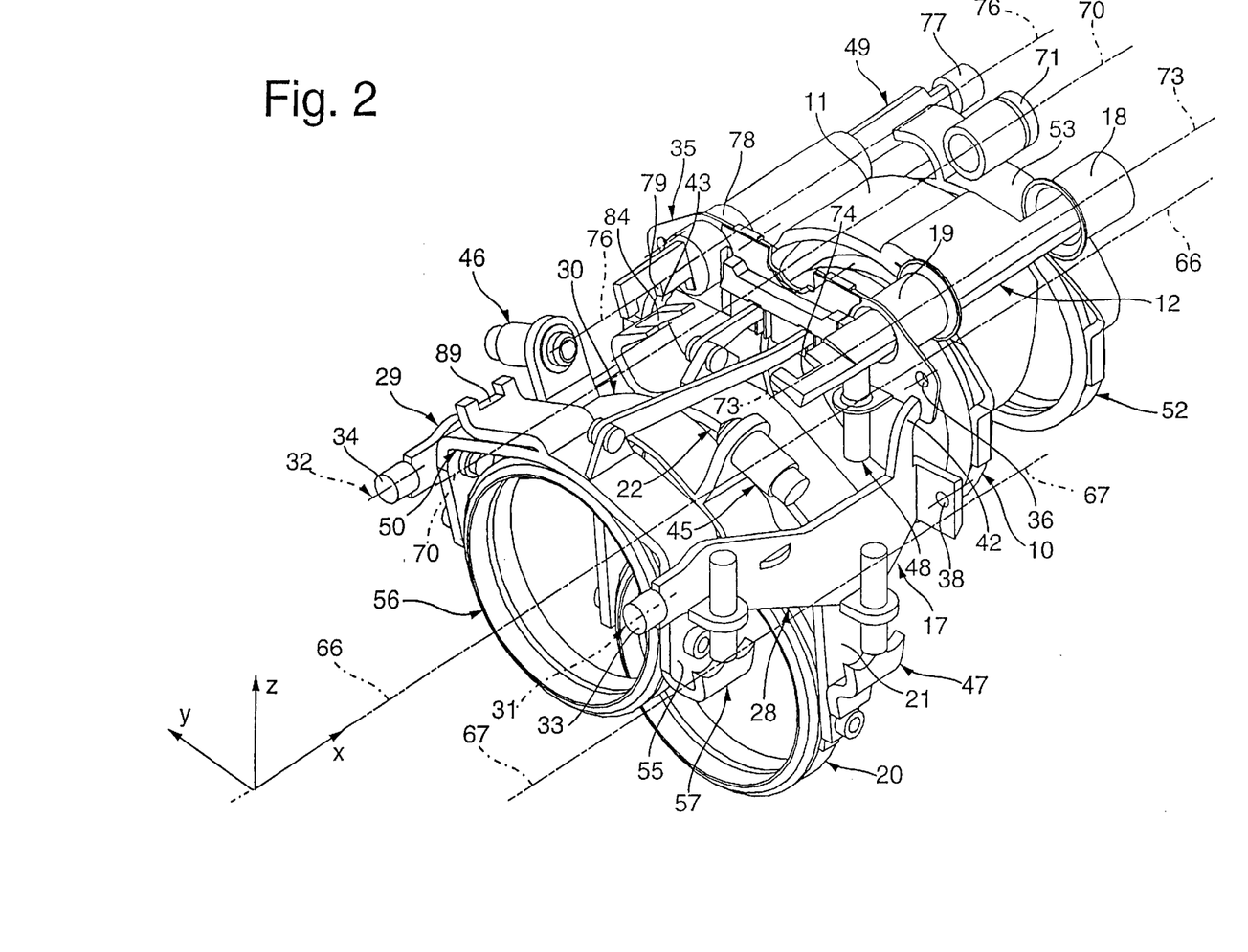
FIG. 2 is a perspective view of a shift device according to the invention in an embodiment for a change speed gearbox in accordance with FIG. 1, viewed approximately in the direction of the arrow II in FIG. 3.
Figure 3:
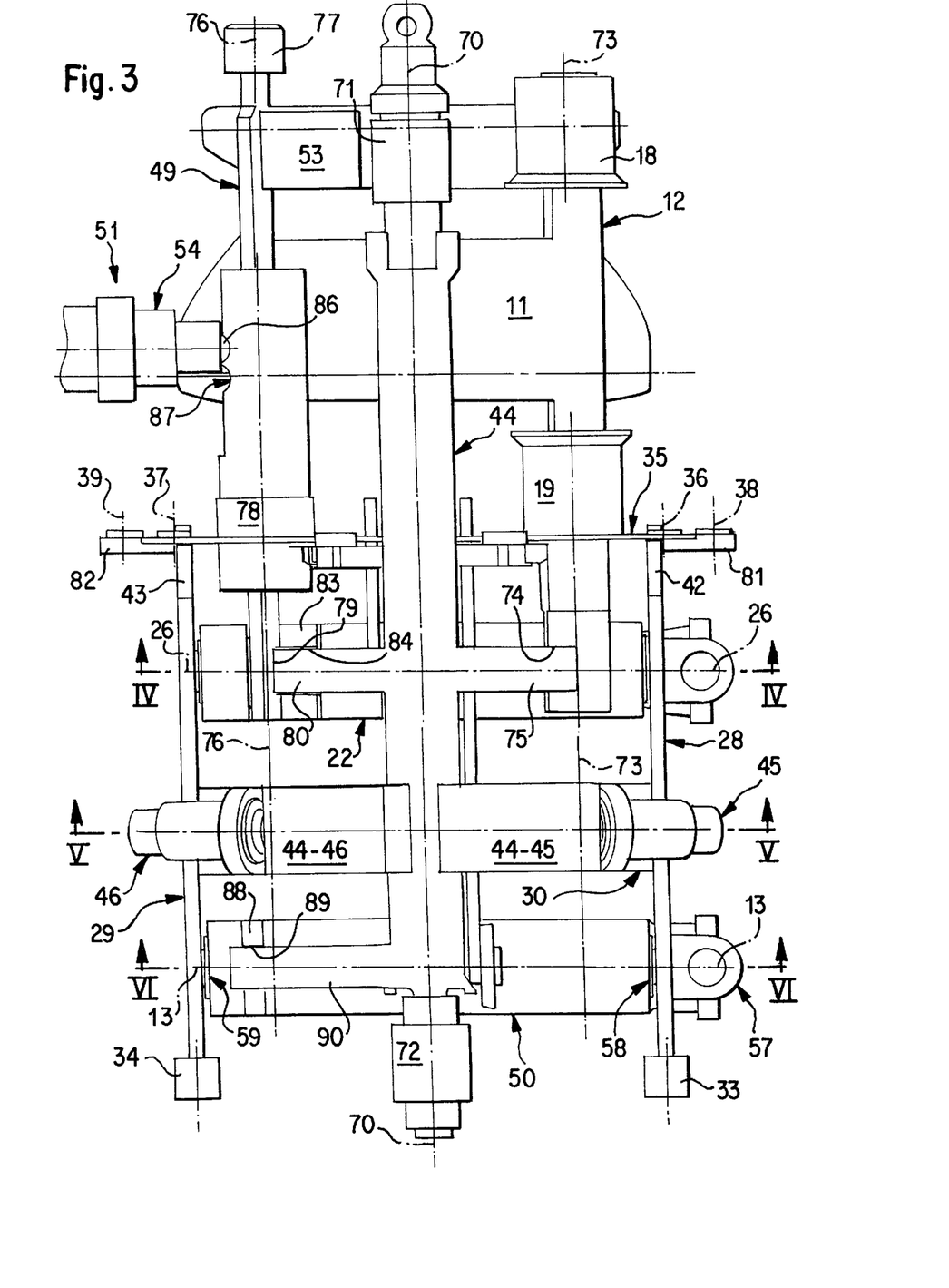
FIG. 3 is a plan schematic view of the shift device of FIG. 2.

The shift casing unit 17 has two bearing brackets 28 and 29 which are in the form of carriers and which are arranged on both sides of the sliding shift sleeves 20 and 56 and in the longitudinal direction of the gearbox shafts 14, 25 and 60.

The bearing bracket 28 has at its one end both a nose-like projection 42, for fixing in relation to that part 40 of the end plate 35 which has the through-hole 36, and an attachment bracket 81 with a screw hole 38 for its screwed attachment to the casing part 15, the latter being provided with a threaded hole 15-38 for this purpose.

The fixing the bearing bracket 28 in relation to the end plate 35 by means of the bracket's projection 42 or the screwed attachment of the bearing bracket 28 to the casing part 15 by means of the bracket's attachment bracket 81 with the screw hole 38 can also be provided as desired.

The bearing bracket 29 has at its one end both a nose-like projection 43 for fixing in relation to that part 41 of the end plate 35 which has the through-hole 37, and an attachment bracket 82 with a screw hole 39 for its screwed attachment to the casing part 15, the latter being provided with a threaded hole 15-39 for this purpose.

The bearing brackets 28 and 29 are rigidly connected to one another, by means of a crossmember 30 in the form of a carrier, at a point located in the longitudinal directions of the gearbox shafts 14, 25 and 60 between the sliding shift sleeves 22 and 56.

The input-side casing part 27 of the gearbox casing 16 has a support 31 and 32, in the form of bearing eyes for each of the facing ends of the bearing brackets 28 and 29, in which bearing eyes corresponding guide pins 33 and 34 of the bearing brackets are guided in an axially sliding manner.

Figure 4:
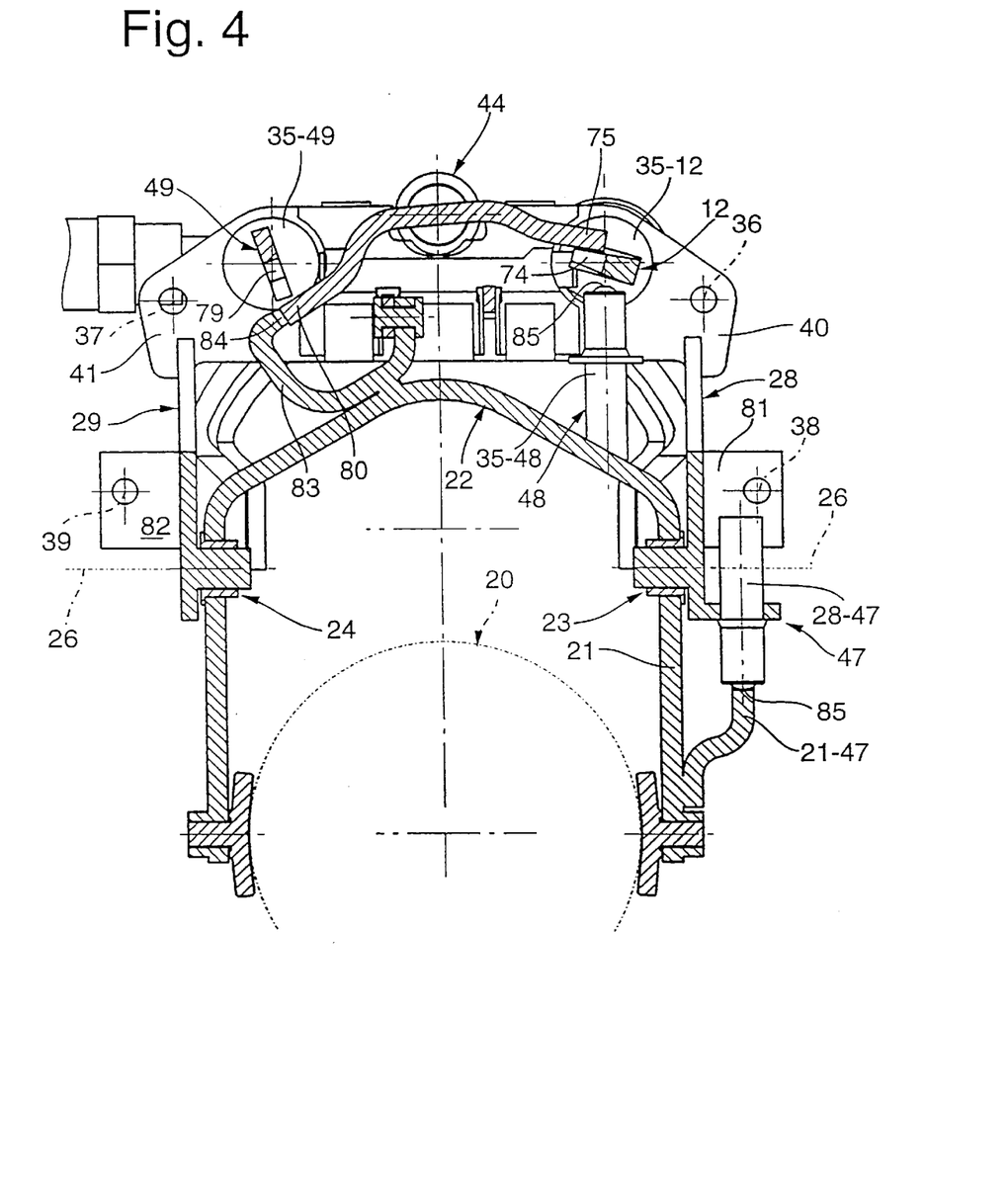
FIG. 4 is a sectional view through the shift device in FIG. 2 along the line IV—IV in FIG. 3.

The sliding shift sleeve 20 is activated in the usual manner by a shift fork 21 by means of two sliding blocks, which shift fork 21 is constructed in one piece with a shift rocker 22 which itself is mounted, at a point located between crossmember 30 and end plate 35, so as to be pivotable about a geometric pivot axis 26—26, aligned perpendicularly with respect to the gearbox shafts 14, 25, 60, by means of two coaxial pivot bearings 23 and 24 on the bearing brackets 28 and 29. A driver 83, which has a shift slot 84 for the engagement of the shift finger 80 of the shift shaft 44, is arranged fixedly in terms of movement in relation to the shift rocker 22. The positions of the shift fork 21 for the engaged and the disengaged state of the associated gear wheel clutch 62 can be fixed in relation to the gearbox casing 16 by means of one latching device 47. The latching device 47 has a receptacle 28-47, attached to the bearing bracket 28, for a spring-loaded latching sphere 85 which interacts with a corresponding latching means contour 21-47 of the shift fork 21.

Figure 5:
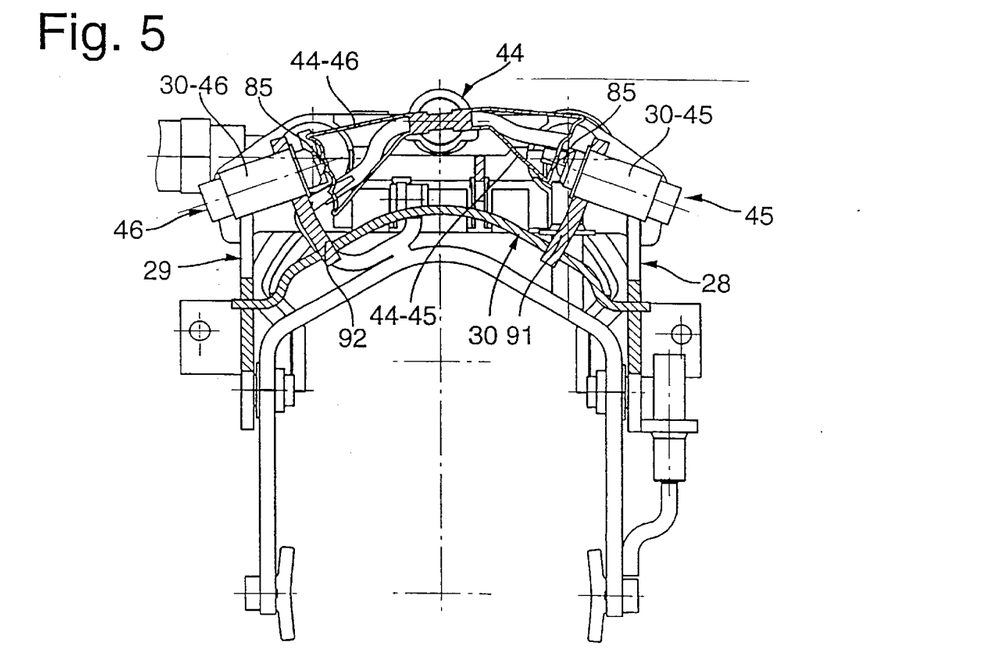
FIG. 5 is a sectional view through the shift device in FIG. 2 along the line V—V in FIG. 3.

The sliding shift sleeve 56 is activated in the usual manner by a shift fork 55 by means of two sliding blocks, which shift fork 55 is arranged fixedly in terms of movement with respect to a shift rocker 50. The shift rocker 50 is mounted at a point located between the crossmember 30 and the supports 31, 32 (guide pins 33 and 34), so as to be pivotable about a geometric axis 13—13, aligned perpendicularly with respect to the gearbox shafts 14, 25, 60, by means of two coaxial pivot bearings 58 and 59 on the bearing brackets 28 and 29. The shift rocker 50 is connected fixedly in terms of movement to a driver 88 which has a shift slot 89 for the engagement of a shift finger 90 of the shift shaft 44. The positions of the shift fork 55 for the engaged and the disengaged state of the associated gear wheel clutch 61 can be fixed in relation to the gearbox casing 16 by means of a latching device 57. The latching device 57 has a receptacle 28-57, secured to the bearing bracket 28, for a spring-loaded latching sphere 85 which interacts with a corresponding latching means contour 55-57 on the shift fork 55.

Figure 6:
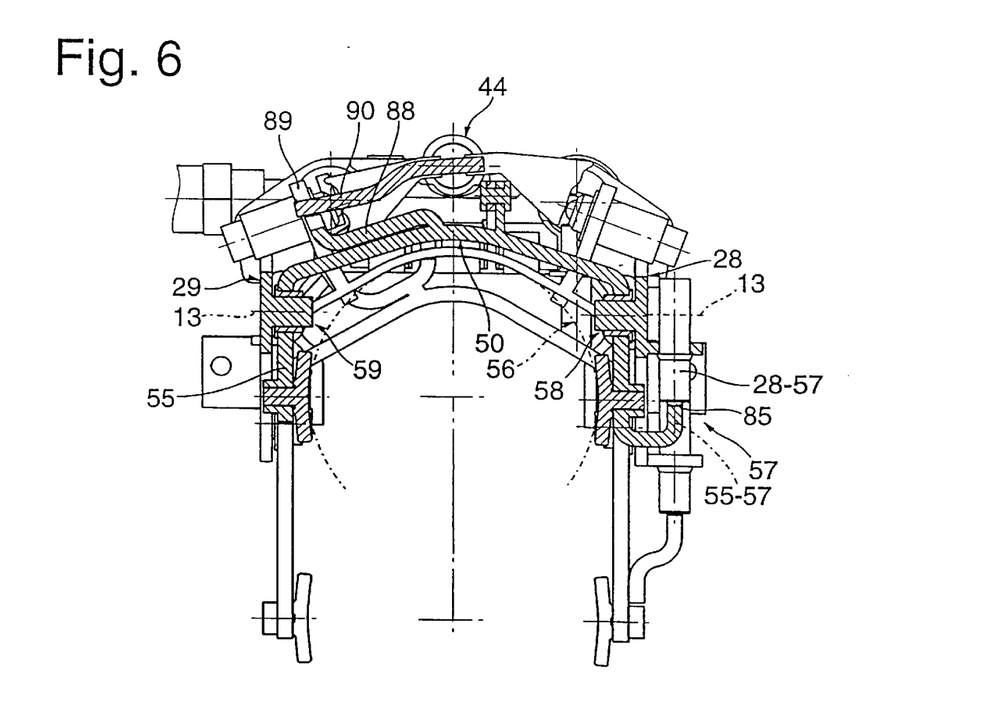
FIG. 6 is a sectional view through the shift device in FIG. 2 along the line VI—VI in FIG. 3.

The crossmember 30 is provided with a latching device 45 for the positions of the shift shaft 44 which are associated with the shift movements. For this purpose, a bracket 91, to which a casing-like receptacle 30-45 for a spring-loaded latching sphere 85 is secured, is fixedly arranged on the crossmember 30. The latching sphere 85 of the latching device 45 interacts with a latching segment 44-45 which is arranged fixedly in terms of movement with respect to the shift shaft 44.

Finally, the crossmember 30 is also provided with a latching device 46 for the positions of the shift shaft 44 which are assigned to the selection movements. For this purpose, a bracket 92, to which a casing-like receptacle 30-46 for a spring-loaded latching sphere 85 is secured, is fixedly arranged on the crossmember 30. The latching sphere 85 of the latching device 46 interacts with a latching segment 44-46 which is arranged fixedly in terms of movement with respect to the shift shaft 44.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Shift device for a change speed gearbox having a first gear wheel clutch for coupling a first gear wheel to its gearbox shaft, having a shift fork for activating the first gear wheel clutch, having a shift rod which is arranged with an axis parallel to the gearbox shaft and is arranged fixedly in terms of movement in relation to the shift fork and is mounted at one end so as to be axially displaceable in relation to a first casing part of a gearbox casing, which is divided in two, and is mounted at a further point so as to be axially displaceable, in each case by means of a bearing arrangement, in relation to a shift casing unit which is releasably attached to the first casing part, having a second gear wheel clutch for coupling a second gear wheel to its gearbox shaft, having a shift rocker used for activating the second gear wheel clutch, which shift rocker is mounted so as to be pivotable in relation to a second casing part of the gearbox casing about a geometric pivot axis aligned perpendicularly with respect to the gearbox shafts, by means of two coaxial pivot bearings, characterized in that the shift casing unit has two bearing brackets which are in the form of carriers and are each arranged at a respective side of the shift rocker and in a longitudinal direction of the gearbox shafts, in that the shift casing unit has, at a point located offset with respect to the two coaxial pivot bearings for the shift rocker in the longitudinal direction of the gearbox shafts, a crossmember which is in the form of a carrier, is arranged transversely with respect to the gearbox shafts and is used to arrange the two bearing brackets fixedly in terms of movement relative to one another, in that each of the two pivot bearings are arranged on one of the bearing brackets, and in that an end of the shift casing unit located opposite the bearing arrangement for the shift rod can be fixed in relation to the second casing part at least in the directions which are perpendicular to the gearbox shafts by means of at least one releasable support.

2. Shift device according to claim 1, wherein in each case one guide pin, arranged with an axis parallel to the gearbox shafts, of the bearing brackets is used for the support.

3. Shift device according to claim 1, wherein the shift casing unit has an end plate, which bears the bearing arrangement for the shift rod, and is arranged in a casing plane, perpendicular with respect to the gearbox shafts, as well as being arranged essentially fixedly in terms of movement with respect to the bearing brackets.

4. Shift device according to claim 3, wherein the bearing brackets, the crossmember and the end plate form a premountable inherently rigid frame.

5. Shift device according to claim 3, wherein the bearing brackets, the crossmember and the end plate are manufactured using sheet-steel stamping technology.

6. Shift device according to one of claim 1, wherein at least one of two attachments between the shift casing unit and that first casing part of the gearbox casing which bears the shift rod is provided, and wherein the first casing part is connected by one attachment to a part of the end plate which is connected to one of the bearing brackets, and wherein the first casing part is connected by means of the other attachment to a part of one of the bearing brackets which is connected to the end plate.

7. Shift device according to claim 1, wherein a latching device which is assigned to selection movements of a shift shaft used for activating the shift rod and the shift rocker is arranged at the crossmember.

8. Shift device according to claim 1, wherein a latching device which is assigned to shift movements of a shift shaft used for activating the shift rod and the shift rocker is arranged at the crossmember.

9. Shift device according to claim 1, wherein a latching device which is assigned to positions of the shift rocker is arranged at one of the bearing brackets.

10. Shift device according to claim 1, wherein a latching device which is assigned to positions of the shift rod is arranged at the end plate.

11. Shift device according to one of claim 1, wherein at least one additional shift rod is appropriately mounted in relation to the shift casing unit and the first casing part of the gearbox casing.

12. Shift device according to claim 11, wherein a latching device which is assigned to positions of the additional shift rod is arranged at the first casing part of the gearbox casing which supports the additional shift rod.

13. Shift device according to claim 12, wherein the additional shift rod is used for activating a gear wheel clutch which is associated with a reverse gear, and in that a switch contact of a reverse light switch which is inserted into the first casing part of the gearbox casing which supports the additional shift rod is used as a sprung latching means for a position of the additional shift rod which is associated with the reverse gear.

14. Shift device according to claim 11, wherein the bearing brackets are used for appropriate support of at least one additional shift rocker.

15. Shift device according to claim 14, wherein a latching device assigned to positions of the additional shift rocker is arranged on one of the bearing brackets.

16. Shift device according to claim 15, wherein the shift casing has an end plate, wherein a latching device which is assigned to selection movements of a shift shaft used for activating the shift rod, the additional shift rod, the shift rocker, and the additional shift rocker is arranged at the crossmember, wherein a latching device which is assigned to shift movements of the shift shaft is arranged at the crossmember, wherein a latching device which is assigned to positions of the shift rocker is arranged at one of the bearing brackets, wherein a latching device which is assigned to positions of the shift rod is arranged at the end plate, and wherein the bearing brackets, the crossmember, the end plate, the shift rod, the additional shift rod, the shift rocker, the additional shift rocker, the latching device assigned to selection movements of the shift shaft, the latching device assigned to shift movements of the shift shaft, the latching device assigned to positions of the shift rocker, the latching device assigned to positions of the additional shift rocker, and the latching device assigned to positions of the shift rod are constructed as a premountable physical unit.

17. A transmission assembly comprising:
a first axially displaceable shift rod operable to actuate a first gear wheel clutch by movement thereof in a transmission axial direction,
a first pivotably displaceable shift rocker operable to actuate a second gear wheel clutch by pivotal movement thereof about a first rocker pivot axis extending transverse to the transmission axial direction,
a shift casing unit,
a casing housing including first and second casing housing parts connected to one another in use and enclosing the shift casing unit and at least portions of the first shift rod and the first shift rocker,
wherein said shift casing unit is releasably connectable to said casing housing and includes:
a pair of bearing bracket carriers extending in said transmission axial direction at respective opposite sides of the first shift rocker and having respective aligned pivotal bearing supports for the first shift rocker,
a crossmember fixedly connecting the bearing bracket carriers to one another at a location axially spaced from the pivotal bearing supports for the first rocker,
and at least one support detachably engageable with one of said casing housing parts at a location spaced axially from both the crossmember and the pivotal bearing supports for the first shift rocker.

18. A transmission assembly according to claim 17, wherein said pivotal bearing supports for the first shift rocker are disposed in between the crossmember and the at least one support detachably engageable with one of said casing housing parts.

19. A transmission assembly according to claim 18, wherein said at least one support detachably engageable with one of said casing housing parts includes integrally formed end sections of said bearing bracket carriers.

20. A transmission assembly according to claim 19, wherein said first shift rod is supported in said first casing housing part at a support bearing on a side of the crossmember disposed oppositely of said first shift rocker, and
wherein said first shift rocker is supported in said second casing housing part.

21. A transmission assembly according to claim 20, wherein said end sections engage in support openings of said second casing housing part in a manner facilitating insertion of said shift casing unit axially into an open end of said first casing housing part, followed by axial connection of said second casing housing part with said support openings slidable over the end sections of said bearing bracket carriers.

22. A transmission assembly according to claim 17, wherein the shift casing unit includes an end plate with a bearing support for the first shift rod.

23. A transmission assembly according to claim 22, wherein the bearing brackets, the crossmember and the end plate form a premountable inherently rigid frame.

24. A transmission assembly according to claim 22, wherein the bearing brackets, the crossmember and the end plate are manufactured using sheet-steel stamping technology.

25. A transmission assembly according to claim 17, wherein a latching device which is assigned to selection movements of a shift shaft used for activating the shift rod and the shift rocker is arranged at the crossmember.

26. A transmission assembly according to claim 17, wherein a latching device which is assigned to shift movements of a shift shaft used for activating the shift rod and the shift rocker is arranged at the crossmember.

27. A transmission assembly according to claim 17, wherein at least one additional shift rod is appropriately mounted in relation to the shift casing unit and the first casing housing part of the gearbox casing.

28. A transmission assembly according to claim 27, wherein a latching device which is assigned to positions of the additional shift rod is arranged at the first casing housing part of the gearbox casing which supports the additional shift rod.

29. A transmission assembly according to claim 28, wherein the additional shift rod is used for activating a gear wheel clutch which is associated with a reverse gear, and in that a switch contact of a reverse light switch which is inserted into the first casing housing part of the gearbox casing which supports the additional shift rod is used as a sprung latching means for a position of the additional shift rod which is associated with the reverse gear.

30. A transmission assembly according to claim 17, wherein the bearing bracket carriers support at least one additional shift rocker.

31. A transmission assembly according to claim 30, wherein a latching device for the first shift rocker and a latching device for the at least one additional shift rocker are each arranged on one of the bearing bracket carriers.

32. A transmission assembly according to claim 31, wherein the bearing bracket carriers, the crossmember, the shift rocker, the at least one additional shift rocker, the latching device for the shift rocker, and the latching device for the at least one additional shift rocker are constructed as a prefabricated unit which can be inserted axially in the first casing housing part whereafter said second casing part can be axially connected to the first casing housing part and the shift casing unit.

33. A method of making a transmission assembly of the type comprising:

a first axially displaceable shift rod operable to actuate a first gear wheel clutch by movement thereof in a transmission axial direction, a first pivotably displaceable shift rocker operable to actuate a second gear wheel clutch by pivotal movement thereof about a first rocker pivot axis extending transverse to the transmission axial direction, a shift casing unit, a casing housing including first and second casing housing parts connected to one another in use and enclosing the shift casing unit and at least portions of the first shift rod and the first shift rocker, wherein said shift casing unit is releasably connectible to said casing housing and includes:

a pair of bearing bracket carriers extending in said transmission axial direction at respective opposite sides of the first shift rocker and having respective aligned pivotal bearing supports for the first shift rocker, a crossmember fixedly connecting the bearing bracket carriers to one another at a location axially spaced from the pivotal bearing supports for the first rocker, and at least one support detachably engageable with one of said casing housing parts at a location spaced axially from both the crossmember and the pivotal bearing supports for the first shift rocker, wherein said method includes:

assembling the shift casing unit and the first shift rocker as a unit, axially inserting the unit in an open axial end of the first casing housing part with said first shift rod extending in said first casing housing part toward the crossmember, and axially connecting the second casing housing part to the first casing housing part with support pin sections at ends of said bearing bracket carriers engaging in corresponding support openings provided in the second casing housing part.

* * * * *